April 11, 1950     E. ORSHANSKY, JR.     2,504,040
DRIVING MECHANISM
Filed Jan. 12, 1945     4 Sheets-Sheet 3
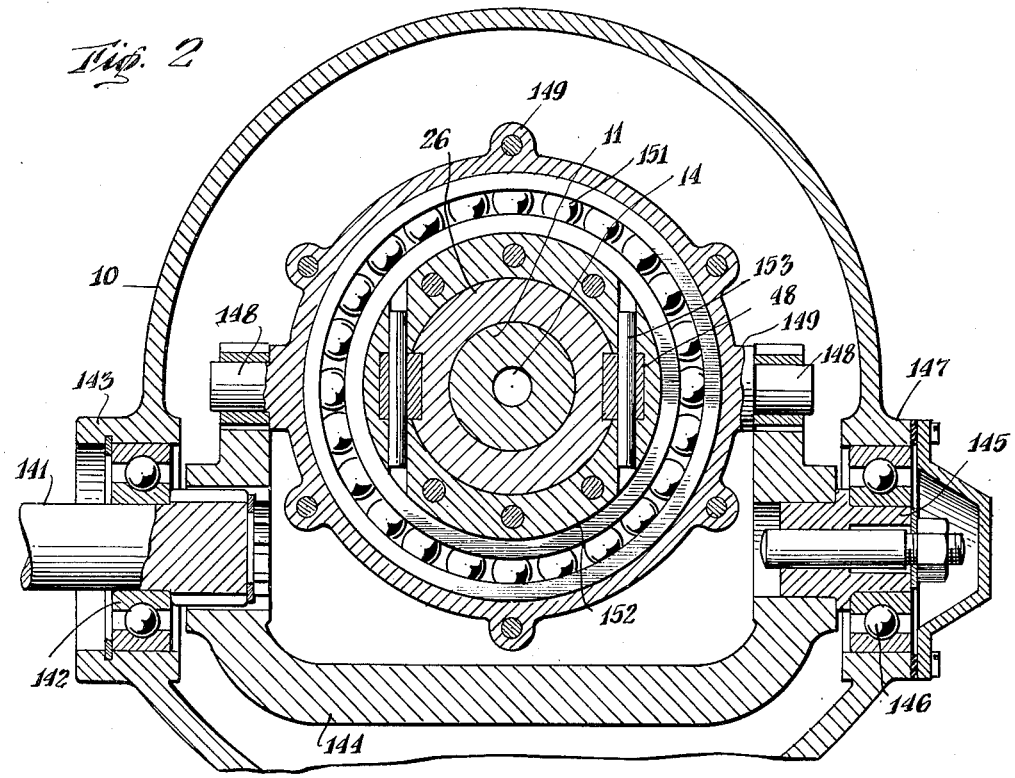
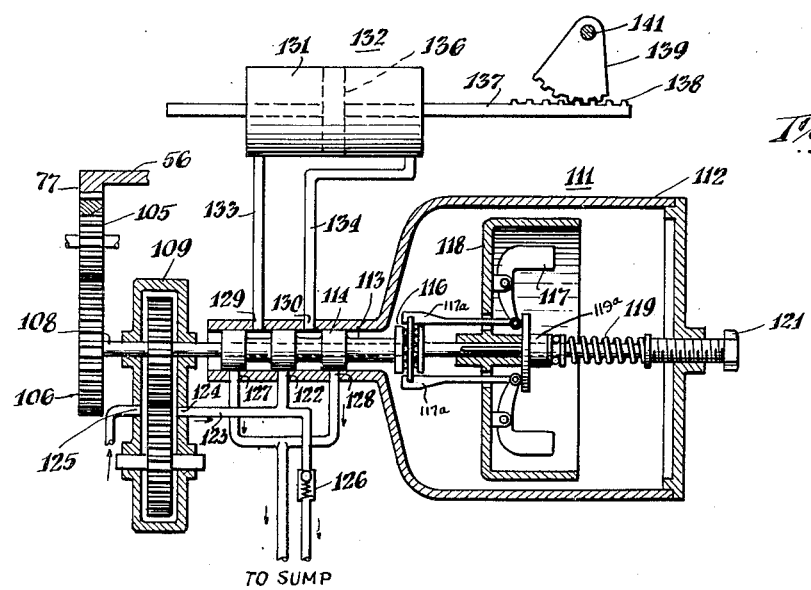
INVENTOR.
Elias Orshansky, Jr.
BY
ATTORNEYS April 11, 1950  E. ORSHANSKY, JR  2,504,040
DRIVING MECHANISM
Filed Jan. 12, 1945  4 Sheets-Sheet 4
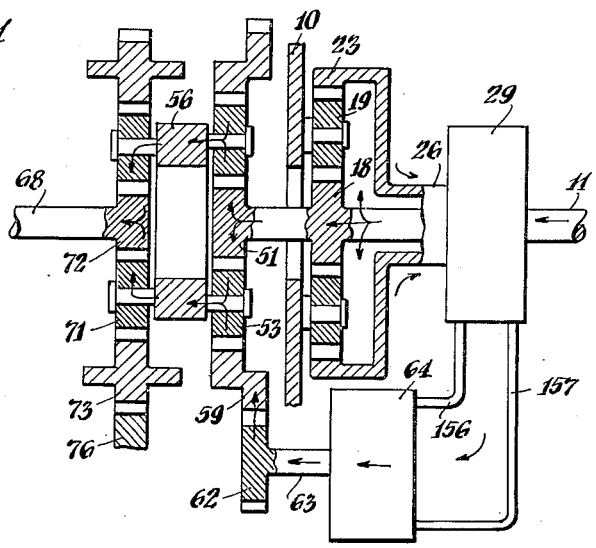
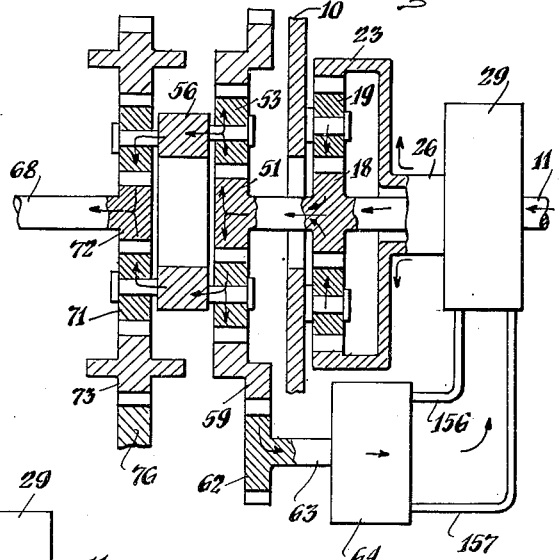
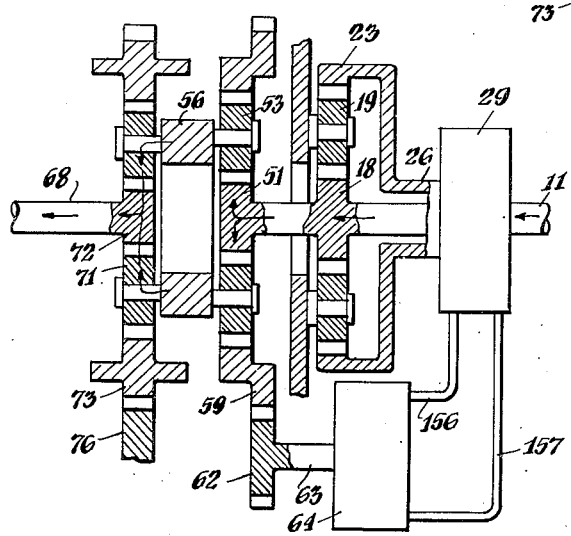
INVENTOR.
Elias Orshansky, Jr.
BY
ATTORNEYS Patented Apr. 11, 1950

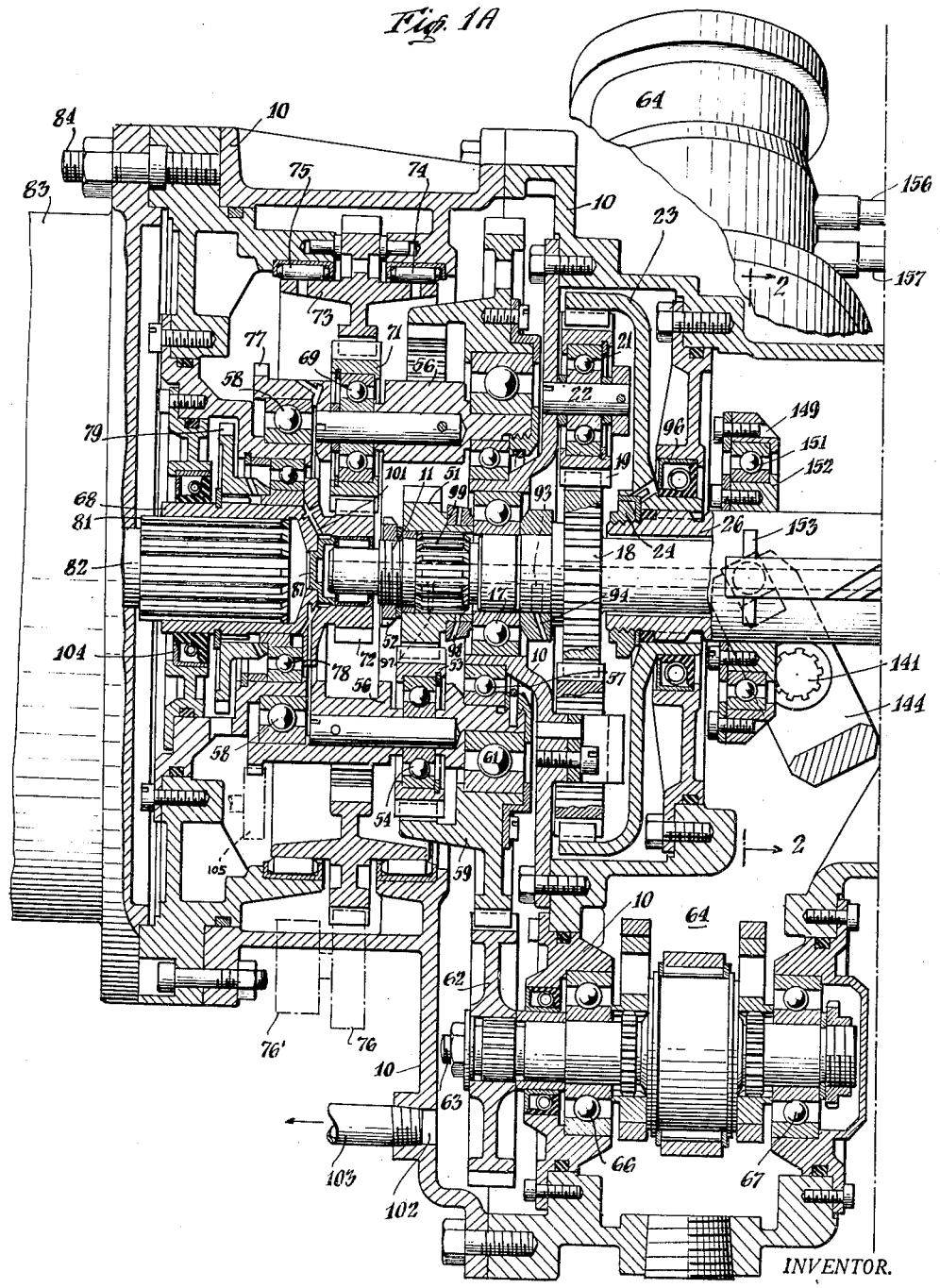

2,504,040

UNITED STATES PATENT OFFICE 2,504,040

DRIVING MECHANISM

Elias Orshansky, Jr., Stamford, Conn., assignor to The Acrotorque Company, Stamford, Conn., a corporation of Connecticut Application January 12, 1945, Serial No. 572,462

11 Claims. (Cl. 74—687)

This invention relates to a driving mechanism, particularly to a hydro-mechanical drive, and has for an object the provision of means for maintaining the output shaft thereof at a predetermined constant speed.

Another object of the invention is to provide a mechanism for automatically driving a dynamo at constant speed.

Still another object of the invention is to provide a driving mechanism for aircraft in which the driving shaft is driven at predetermined variations in speed, corresponding to idling, take-off, and cruising speeds of the aircraft engine, while the driven shaft is automatically maintained at a predetermined constant speed.

Still another object of the invention is to provide an improved drive in which plus or minus variations of a predetermined speed of the driving shaft are immediately recognized and converted hydro-mechanically to respectively regulate the driven shaft at a predetermined speed.

Still another object of the invention is to provide an improved drive in which coarse and fine adjustments are made to control the speed of the output shaft.

A further object of the invention is to provide an improved drive for controlling the output shaft thereof at a constant speed by hydraulically converting a step-up in rotation of the driving shaft, for example, at take-off speed, into torque and employing this torque to reduce the output shaft speed to a predetermined value.

A still further object of the invention is to provide an improved hydro-mechanical power transmission capable of varying the angular velocity ratio between the input and output means by infinitely small steps.

A still further object of the invention is to provide an improved drive for controlling the output shaft thereof at a constant speed by hydraulically utilizing the increased torque produced by a drop in rotation of the driving shaft, for example, at idling speed, to increase rotation of the output shaft to a predetermined value.

A still further object of the invention is to provide an improved drive in which the driving shaft is driven at constant speed and the driven shaft is maintained at pre-selected speeds.

With the above objects in view, one embodiment of the invention comprises a driving mechanism of the hydraulic-mechanical type wherein a driving shaft is connected at one point through a gear-reduction train to a variable-stroke hydraulic unit and at another point to a double planetary-gear train having a common cage for supporting input and output planetary pinions, the latter of which are coupled to an output shaft for driving an alternator at constant speed. The output shaft is maintained at substantially constant speed through two separate controls, one for coarse adjustments and the other for fine adjustments in output speed, said controls being coupled to the respective ring gears of the double planetary train. In the coarse control, speed variations below or above a predetermined speed of the planetary cage are detected and translated by a control mechanism that correspondingly varies the piston stroke of the variable stroke hydraulic unit, which under a low speed condition revolves in the proper direction the input ring gear of the double planetary train through a fixed-stroke hydraulic unit, and which under a high speed condition is driven by the fixed-stroke hydraulic unit through energy received from the input ring gear. Finer adjustments of output speed are produced by rotating the output ring gear of the double planetary-gear train in the required direction and at the desired speed through a control device coupled to a reference point on the output shaft. When the finer adjustments are not required, the output ring gear is locked in position.

A more complete understanding of this invention will be obtained from the detailed description which follows and by reference to the appended drawings, which show one embodiment thereof.

Referring to the drawings:

Figs. 1A and 1B, when abutted at the dash lines, show a longitudinal sectional view of the hydro-mechanical driving mechanism, Fig. 1A showing the driven end, including the gear trains and fixed-stroke hydraulic unit and Fig. 1B showing the driving end and the variable-stroke hydraulic unit thereof;

Fig. 2 shows an enlarged sectional view, taken along line 2—2 of Fig. 1A, of the control lever and associated mechanism for regulating the piston stroke of the variable hydraulic unit;

Fig. 3 shows a schematic view of the coarse speed control mechanism for regulating the variable hydraulic unit piston stroke through the mechanism shown in Fig. 2; and Figs. 4, 5, and 6 show schematic views of torque conversion in the driving mechanism at idling, take-off, and cruising speeds, respectively, of an aircraft engine.

Figure 1B:
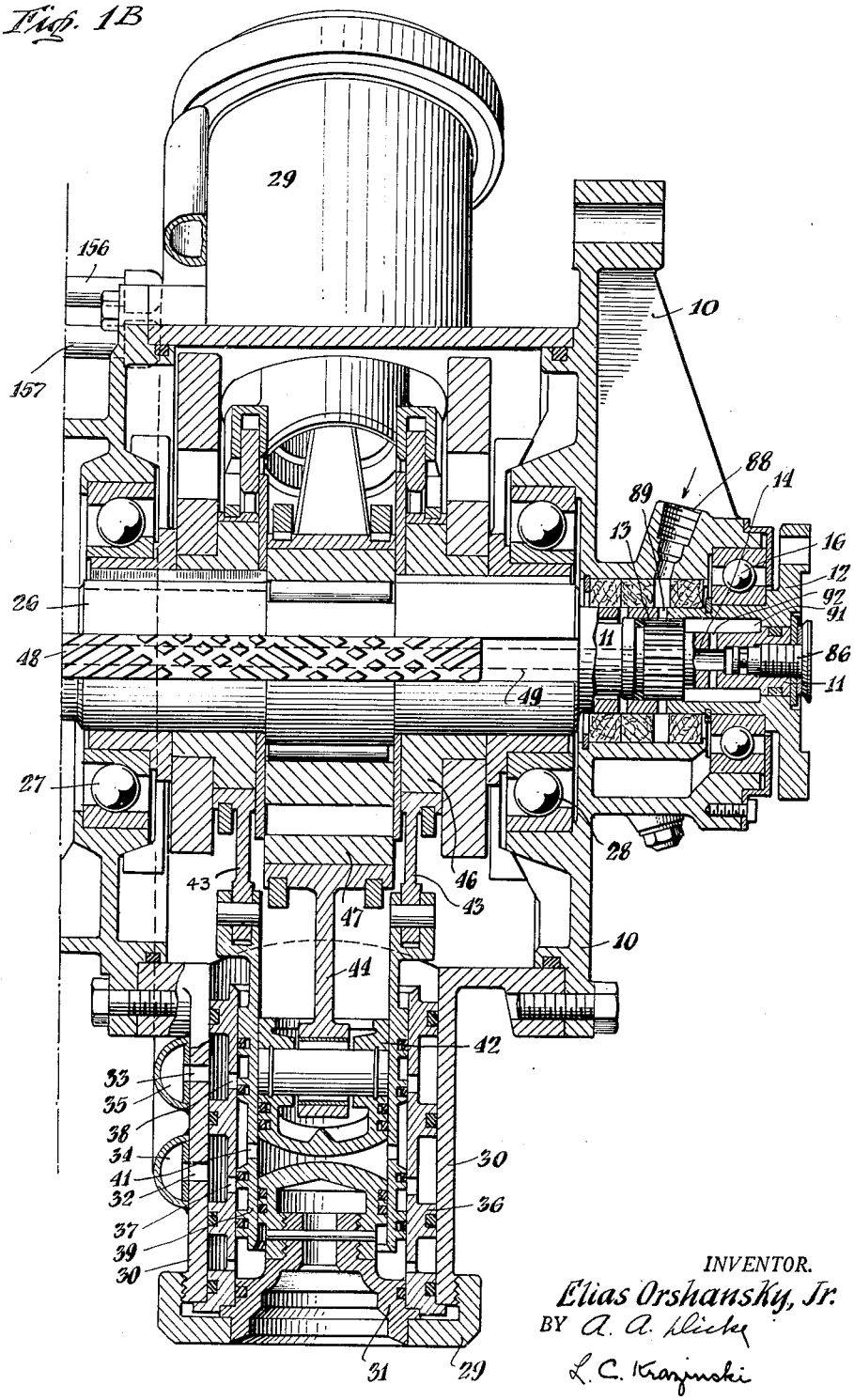

Referring now to the drawings, particularly Figs. 1A and 1B, there is shown a frame 10 in which is rotatably mounted a driving shaft 11 coupled at one end to a flange 12 in any suitable manner, as by splines 13, the flange 12 being connected through the usual universal joint (not shown) and driving shaft (not shown) to a suitable power source or prime mover (not shown) of the airplane type, such as an internal combustion engine. The driving shaft 11, which is shown with an axial opening 14 through the entire length thereof for providing a lubricating channel for the various parts of the mechanism, to be described hereinafter, is rotatably mounted upon anti-friction bearings 16, 17, secured to the frame 10. Adjacent the inner end of the driving shaft 11 (Fig. 1A) is rigidly mounted a sun gear 18, preferably integral therewith in order to obtain greater strength in the shaft 11. Sun gear 18 meshes with a plurality of pinions 19, preferably four, rotatably mounted on anti-friction bearing 21, the inner race of which encircles a pin 22, which is secured in frame 10 and thus prevents orbital movement of pinions 19. The pinions 19 also mesh with an internally-toothed ring gear 23, which is fixedly mounted by a nut 24 on a hollow shaft 26, such as a quill shaft, which in turn is concentric with the driving shaft 11 and is freely rotatable relative thereto. Quill shaft 26, which is mounted upon anti-friction bearings 27 and 28 (Fig. 1B), is shown operably connected with a variable piston-stroke hydraulic unit 29 having a plurality of cylinders, preferably five, disposed radially therearound and carried by frame 10. It is thus seen that gears 18, 19, and 23 comprise a reduction gear train in which ring gear 23 and quill shaft 26 are revolved at a fraction of the driving shaft speed. In practice a reduction of 2.667 to 1 has been selected as a desirable ratio.

The hydraulic unit 29 may be of any suitable type, preferably of the sleeve valve construction, and is shown similar to that disclosed in my pending application Serial Number 459,389, filed September 23, 1942, which matured into Patent 2,393,558 on January 22, 1946. As illustrated, the unit 29 comprises a cylinder 30 having a head 31 and passages 32, 33 interconnecting manifolds 34, 35, respectively, an interior cylinder liner 36 having corresponding ports 37 and 38, and a reciprocating sleeve valve 39 having a port 41 for regulating flow of liquid to and from said passages and ports to the interior of cylinder 30 within which a piston 42 reciprocates. The sleeve valve 39 and working piston 42 are respectively actuated through connecting rods 43, 44. The connecting rods 43 are operated by an eccentric 46 and the piston rods 44 are slidably mounted upon a variable eccentric 47, said eccentrics being mounted on quill shaft 26 for rotation therewith. The eccentricities of the eccentric 47, and correspondingly the length of the working piston strokes, are varied in a manner similar to that disclosed in my Patent No. 2,256,324, filed July 20, 1939, and issued September 16, 1941, namely, by axially translatory movement of a pair of keys 48 disposed in complementary keyways 49 of quill shaft 26. Further description of the variable hydraulic unit 29 is not deemed necessary in view of the disclosure in the above Patent 2,256,324 and in view of the fact that the invention does not reside in the details of the hydraulic unit per se.

Adjacent the inner end of the driving shaft 11 and inwardly spaced from the gear 18 is shown a sun gear 51 fixedly secured to shaft 11 by a nut 52 threadedly mounted thereupon. Sun gear 51 meshes with a plurality of input planetary pinions 53, preferably four, mounted upon anti-friction bearing 54, the inner races of which are affixed to a planet carrier or cage 56, which is rotatably disposed on frame 10 by anti-friction bearings 57, 58. Planetary pinions 53 also mesh with internal teeth of ring gear 59 rotatably mounted on cage 56 by anti-friction bearing assembly 61. Gear 59, which may be termed herein as an input ring gear, is also provided with external teeth which mesh with a gear 62 fixedly attached to a shaft 63 of a fixed-eccentric hydraulic unit 64, the shaft 63 being rotatably supported by anti-friction bearings 66, 67, the outer races of which are secured in frame 10. Fixed-eccentric hydraulic unit 64 is similar in design to the variable-eccentric hydraulic unit 29 with the exception that the piston stroke is of a definite length.

Cage 56, which is common to both the driving shaft 11 and driven shaft 68, has also mounted thereupon through anti-friction bearing 69 a plurality of output planetary pinions 71, preferably four, which are staggered with respect to the input planetary pinions 53. Output planetary pinions 71 mesh on the one hand with sun gear 72, rigidly secured to output shaft 68, and on the other hand mesh with internal gear teeth of output ring gear 73, rotatably supported by anti-friction bearings 74, 75, disposed in frame 10 in any suitable manner. Output ring gear 73 is also provided with external teeth for engagement with teeth of a gear 76 connected to a reaction point provided by a speed control device through gear 76, which is held against movement or is actuated by a suitable speed control mechanism, such as shown in my copending application Serial #679,429, filed June 26, 1946, now abandoned. Cage 56 is also provided with a gear 77 rigidly secured thereto for regulating the speed of the cage in accordance with coarse adjustments, which will be described hereinafter. It is readily apparent that the above described planetary gear arrangement may be considered as a double planetary-gear train and has been termed herein as such.

Output shaft 68 is shown rotatably mounted on anti-friction bearing 78, the outer race of which is secured to frame 10. Gear 79, which is fixedly secured to output shaft 68, provides a reference point for determining the fine adjustments that may be made through the above speed-responsive device 76' in the output shaft's speed. Output shaft 68 is also provided with means, such as splines 81, for securing thereto a shaft 82 of a constant-speed dynamo, such as an alternator 83, secured to frame 10 in any suitable manner, as by bolt-nut combination 84.

It thus can be readily seen that rotary motion of the driving shaft 11 is transmitted through two paths to the driven shaft 68, one via reduction-gear train including gears 18, 19, and 23 to quill shaft 26 for actuating the variable-eccentric hydraulic unit 29; and the other path through a double planetary-gear train including gears 51, 53 on the input side, and gears 71, 72 on the output side of common cage 56, and thence to the output shaft 68, coarse and fine adjustments in the speed of cage 56 being produced through input and output ring gears 59, 73, respectively.

The manner in which the various gears, bearings, etc., exclusive of the hydraulic units, are lubricated will now be described. As mentioned hereinbefore, shaft 11 is provided with an axial bore 14 extending therethrough, plugs 86, 87 respectively sealing the ends thereof. As shown, an inlet passage 88 is provided in frame 10 for admitting the lubricating oil to the system, opening 89 being provided in flange 12 in registration with said inlet passage 88, further passage of oil being provided through the splines 13, space 91, formed between a reduced section of shaft 11 and flange 12, and openings 92 transversely through the shaft 11 interconnecting space 91 with bore 14. The lubricating oil is then passed through bore 14 of shaft 11, openings 93 and 94 in driving shaft 11 (Fig. 1A), for supplying the reduction gear train, sealing members 96 of any suitable type being employed for preventing escape of the lubricating fluid. Openings 97 in shaft 11 and openings 98 in gear 51, in conjunction with splines 99, provide a lubricating passageway for the planetary gear train. Further openings, such as openings 101 in output shaft 68, are provided for lubricating the bearings, etc. for the output shaft. An opening 102 is provided in frame 10 as an outlet for the lubricating fluid, conduit 103 interconnecting with a fluid pump (not shown) of any suitable type, which pump is adapted for delivering the lubricating fluid to the inlet passage 88. Further sealing members 104 are disposed at appropriate points for sealing the lubricating oil in the system. It might be further mentioned that lubrication of the hydraulic units 29, 64 is accomplished by the working liquid employed therein.

Referring next to Figs. 2 and 3, the coarse control mechanism for regulating the speed of the cage 56 through adjustment of the variable-eccentric hydraulic unit 29 will be described. Referring particularly to Fig. 3, an idler gear 105 is shown interposed between gear 77 of the cage 56 and a gear 106, which is fixedly secured to a shaft 108 of a liquid gear pump 109, of the usual type, driven by shaft 108 or by any suitable power means (not shown). While the coarse speed control is shown in this embodiment as being derived from cage 56 through gear 77, it is not to be limited to this connection as the coarse speed control may be derived from the output shaft 68. Shaft 108 is shown extending through a speed-responsive device 111, which comprises a casing 112 in which is provided a valve sleeve 113 freely mounted upon shaft 108 and adapted for longitudinal movement. Valve sleeve 113 is shown provided with a series of spaced protuberances 114 for slidable engagement with the neck portion of casing 112, and with a collar 116 for engagement with a pair of links 117a pivoted to centrifugal arms 117 pivotally fastened to a support, such as a cup member 118, which is splined to shaft 108. Arms 117 are positioned by a spring 119 bearing against the slidable flange 119a. Compression of spring 119 may be adjusted through screw 121 threadedly mounted in casing 112. Casing 112 is also provided with an inlet port 122, which is connected through a conduit 123 to an outlet port 124 in gear pump 109, which has an inlet port 125 that may be connected in any suitable manner to a source of fluid supply. A relief valve 126 is interposed between conduit 123 and the sump for by-passing the liquid when the pressure in conduit 123 exceeds a predetermined amount, as when the valve 113 is in a neutral position, as shown. A pair of outlet ports 127, 128 are provided in casing 112 for connection to the sump or low-pressure side of the hydraulic system. In addition, a pair of ports 129, 130 are adapted for connection to opposite ends of a cylinder 131 of a servomotor 132, of the usual type, through conduits 133, 134, respectively. Piston 136 of the servomotor 132 has one end of its shaft 137 formed with teeth 138, as a rack, for engagement with a gear segment 139 mounted upon a rotatable control shaft 141.

The protuberances 114, in the position of the valve 113 shown in Fig. 3, prevent flow of liquid from inlet port 122 across the valve 113 to the servomotor 132, the liquid escaping through relief valve 126 to the sump. Piston 136 is thus disposed in a neutral position. Assuming that the speed of the cage 56 is below that of a predetermined standard, such as at idling speed of an aircraft engine, centrifugal arms 117 under action of spring 119 will force the valve sleeve 113 and protuberances 114 to the left and permit fluid from pump 109 to enter the motor 132, the liquid circuit being traced from outlet port 124 through conduit 123, port 122, space between the right pair of protuberances 114, and thence through port 130 and conduit 134 to the right end of cylinder 131 to act upon piston 136 and position it towards the left. Rack 138 is likewise moved to the left and in turn rotates segment 139 and shaft 141 accordingly. The liquid in the left portion of the cylinder exhausts by way of conduit 133, port 129, the space between the two left protuberances 114, and thence by way of port 127 to the sump. At an increase in speed, such as at take-off speed of an aircraft engine, the centrifugal arms 117 will draw the valve 113 to the right and permit liquid flow through port 122, the space between the two left protuberances 114, out through port 129 into conduit 133 and left end of cylinder 131 to actuate the piston 136 and rack 138 to the right. The liquid in the right portion of the cylinder 131 exhausts by way of conduit 134, port 130, the space between the two right protuberances 114, and thence through port 128 to the sump. Rotation of the shaft 141, as will be described hereinafter, regulates the piston stroke of the variable hydraulic unit 29, which in turn increases or decreases the speed of the output shaft 68 in accordance with a minus or plus variation in the set speed of the cage 56.

In Fig. 2 is disclosed a control mechanism for shifting the position of keys 48, which, as mentioned hereinbefore, regulate the length of the piston stroke for the variable-stroke hydraulic unit 29. Control shaft 141, which is actuated by gear segment 139, as hereinbefore described in connection with Fig. 3, is shown disposed upon anti-friction bearing 142 secured in a hub 143 of frame 10. At the inner extremity of shaft 141 is splined thereto one arm of a yoke member 144, the opposite arm of which is pivotally supported in any suitable manner, as by a composite pin assembly 145, upon anti-friction bearing 146, the outer race of which is disposed in a hub 147 of frame 10. At the extremities of yoke member 144 is journalled a trunnion 148 for supporting a trunnion cage 149, within which is mounted anti-friction bearing 151. A thrust bearing 152 is secured to the inner race of bearing 151 and encircles quill shaft 26. To adapt the thrust bearing 152 for both translatory and rotary movement with respect to the quill shaft 26, the thrust bearing 152 is recessed for engagement with keys 48, which are secured therein by pins 153 passing through aligned openings in both the keys 48 and thrust bearing 152.

In operation, shaft 141, when actuated by the speed-responsive device 112 of Fig. 3, described hereinabove, will in turn actuate the yoke member 144, the arms of which being pivoted in hubs 143, 147 will impart translatory motion to the trunnion cage 149, anti-friction bearing 151, thrust bearing 152, and keys 48 along quill shaft 26 and thereby adjust the eccentricity or stroke of the eccentric 47 of the variable-stroke hydraulic unit 29. At the same time, rotary motion is imparted by the quill shaft 26 to the thrust bearing 152 through engagement of keys 48 therebetween. Thus it is readily apparent that the piston stroke of the variable-eccentric hydraulic unit may be adjusted during operation of the driving mechanism.

In Figs. 4, 5, and 6 schematic views of the driving mechanism are shown, in which Fig. 4 illustrates torque conversion when the driving shaft is driven at idling speed of the airplane engine, in this instance assumed to be 2100 R. P. M.; in which Fig. 5 illustrates torque conversion when the driving shaft is driven at takeoff speed of the airplane engine, in this instance assumed to be 9000 R. P. M.; and in which Fig. 6 illustrates torque conversion when the driving shaft is driven at cruising speed of the airplane engine, assumed in this instance to be 5340 R. P. M. In these figures arrows represent the directions in which energy or torque is transmitted from the driving shaft 11 to the driven shaft 68, which is to be maintained at a constant speed. It is to be noted in all cases that the cage 56 also is to be rotated at a constant predetermined speed, assumed in this embodiment to be 1335 R. P. M. When cage 56 rotates at this speed of 1335 R. P. M., the planetary gear ratio is such that output shaft 68 will rotate at a constant speed of 6000 R. P. M., assuming the ring gear 73 is stationary. It is, of course, understood that any other output speed may be assumed and the embodiment herein is not to be limited to this particular shaft speed.

Referring particularly to Fig. 4, shaft 11 is assumed as revolving at a speed of 2100 R. P. M. which, if connected directly through the double planetary gear train, would produce in the output shaft 68 a speed substantially below that of the required 6000 R. P. M. In order to boost the speed of the driving shaft and assuming the horsepower input remains the same at the various driving speeds, the product of speed and torque must remain a constant and the speed being inversely proportioned to the torque, the torque at this lower speed of 2100 R. P. M. is greater than that at higher speeds. A portion, therefore, of the torque is drawn from the driving shaft 11, as shown by the arrows, through the gear reduction train and quill shaft 26 to operate the variable-stroke hydraulic unit 29, the remainder of the torque passing through the planetary train, as shown. The position of the eccentric 47 of the variable hydraulic unit 29 is set in accordance with the coarse control mechanism, described hereinbefore, which instantly recognizes the decrease in speed of the cage 56 and accordingly shifts keys 48, which in turn increase the eccentricity of the eccentric 47 and stroke of the unit 29. The variable-eccentric unit 29 now operates as a pump and drives fixed-stroke hydraulic unit 64, liquid flowing through conduits or lines 156, 157 interconnecting the hydraulic units, energy thus being transmitted from unit 29 to unit 64. Fixed-eccentric unit 64 in operation revolves shaft 63 and gear 62 in a counter-clockwise direction (facing gear 62 from the left), at a speed of approximately 2850 R. P. M. Since gear 62 meshes with input ring gear 59, the speed of ring gear 59 may be either increased or decreased, depending upon the speed of gear 62. In this instance gear 62 is rotated in the direction indicated above at the said speed of 2850 R. P. M. and therefore the speed of the cage 56 is brought up to that of the required amount, namely, 1335 R. P. M. It is thus seen that a portion of the torque transmitted by the drive shaft 11 is utilized and converted by the hydraulic units into speed at the output of the fixed-eccentric unit 64 to vary rotation of the planetary cage 56 and thereby maintain the output shaft 68 at a substantially constant speed. In the event that finer adjustments are to be made in the speed of the output shaft 68, gear 73 may be rotated by gear 76 under control of speed-responsive device 76' to vary the speed of planetary pinion 71. However, gear 73 may remain in a fixed position.

In Fig. 5, at take-off speed of the airplane engine, the driving shaft 11 is assumed to be driven at 9000 R. P. M. The horsepower being the same, the torque in this condition is low and the speed is high. Therefore, a portion of the excess speed is utilized by the hydraulic units in a reverse manner, that is, the input ring gear 59 is permitted to slip, at a speed under control of the coarse control mechanism which has set the eccentric of unit 29 in accordance with the high cage speed to the other side of the axis of the quill shaft 26 and thus causes oil to flow in the hydraulic unit circuit in the reverse direction. In other words, fixed-eccentric unit 64 is driven through gear 62 and acts as a pump to absorb torque from the planetary system. This torque is transferred through the variable-eccentric unit 29 acting as a motor and thence through the reduction gear arrangement and returned to the input shaft. The energy thus flows as indicated by the arrows. The efficiency of the driving mechanism under these conditions is dependent on both the mechanical gears and the hydraulic system.

In Fig. 6, at cruising speed of the airplane engine, the driving shaft is assumed to be driven at 5340 R. P. M. At this speed the piston stroke of the variable-eccentric hydraulic unit 29 is set at substantially zero position by the coarse control mechanism, the servomotor 132 of which is in a neutral position in view of the correct speed at which cage 56 is assumed to be rotating. The fixed-eccentric hydraulic unit 64 would then be locked against rotation, inasmuch as no liquid is permitted to flow through lines 156, 157, and the input ring gear 59 rendered substantially stationary. At the cruising condition, therefore, the energy flows directly through the double planetary-gear train to the output shaft 68, rotation of quill shaft 26 having no effect upon hydraulic unit 29 in view of its zero stroke setting. The efficiency of the driving mechanism is thus for all practical purposes the efficiency of the gears, with some loss possibly caused by static leakage.

Advantages of the hereinbefore-described driving mechanism reside in the high efficiency at which it operates, particularly when the horsepower is transmitted directly through mechanical means, such as at cruising speed of an airplane engine, where the efficiency of the drive is 90% or above. These advantages become apparent, especially when the drive is employed in aircraft for driving an alternator, which in order to develop a constant frequency output must be driven at a constant rate of speed.

While this invention has been shown and described as embodying certain features in a driving mechanism for delivering a constant speed output, it is, of course, understood that various modifications may be made in the details and operating functions thereof and that the mechanism may be applied to many other and widely varied fields without departing from the scope of the invention, as defined in the appended claims. For example, the features of this invention may also be applied to machine tools, ships, land vehicles, and any other devices where it is desired to vary the speed ratio. Furthermore, the features of this invention may be employed to provide a series of different output speeds derived from a constant speed input by a prime mover through variations in the hereinbefore-described control mechanism.

What is claimed is:

1. In a driving mechanism adapted for converting a variable input speed to a substantially constant output speed, an input shaft, a power source for rotating said shaft at a constant speed, an output shaft, a double planetary-gear train interposed between said shaft, said gear train comprising an input planetary pinion, an output planetary pinion, and a common cage for supporting said pinions, hydraulic means connected to said input shaft and said gear train, said means comprising a variable-stroke hydraulic unit connected to said input shaft and a fixed-stroke hydraulic unit hydraulically interconnected with said variable-stroke unit and mechanically connected to said gear train, and a speed-responsive device coupled to said cage and adapted to vary the piston stroke of said variable hydraulic unit in accordance with the desired output speed.

2. A power transmission comprising driving means, driven means, a planetary gear train interconnecting said driving and driven means, said planetary gear train having at least two points of power application in addition to the said driving means, each capable, when effective, to vary the angular velocity ratio between said driving means and said driven means, and hydro-mechanical means operatively connected to said driving shaft for applying power to one of said points of power application.

3. A power transmission comprising driving means, driven means, a planetary gear train interconnecting said driving and driven means, said planetary gear train having at least two points of power application in addition to the driving means, each capable, when effective, to vary the angular velocity ratio between said driving means and said driven means, and hydro-mechanical means including a variable-capacity hydraulic unit operatively connected to said driving shaft for applying power to one of said points of power application.

4. In a power transmission, driving means, driven means, means for interconnecting said driving means and said driven means comprising two planetary-gear trains, each of said gear trains comprising three elements, one of said elements of one planetary-gear train being connected to said driving means, one of said elements of the other planetary-gear train being connected to said driven means, another of said elements of each planetary-gear train being connected together for movement, and the third of said elements of each of said planetary-gear trains being adapted for connection to supplementary driving means, and hydro-mechanical means connected to said driving means constituting one of said supplementary driving means.

5. In a power transmission, driving means, driven means, means for interconnecting said driving means and said driven means comprising two planetary-gear trains, each of said gear trains comprising three elements, one of said elements of one planetary-gear train being connected to said driving means, one of said elements of the other planetary gear train being connected to said driven means, another of said elements of each planetary gear train being common to both trains, and the third of said elements of each of said planetary-gear trains being adaptable for connection to supplementary driving means, two points of power application in addition to said first-mentioned driving means being provided, each capable, when effective, to vary the angular velocity ratio between said first-mentioned driving means and said driven means, and hydromechanical means connected to said driving means for applying power to one of said points of power application.

6. In a power transmission, a driving shaft, a driven shaft, gears for interconnecting said driving shaft and said driven shaft comprising two planetary-gear trains, each of said gear trains comprising three gear elements, viz., a sun gear, a planetary gear meshing therewith and carried by a support for orbital movement around said sun gear, and a third gear co-axial with its respective sun gear and operatively connected with its respective planetary gear, one of said gear elements of one planetary-gear train being connected to said driving shaft, one of said gear elements of the other planetary-gear train being connected to said driven shaft, another of said gear elements of each planetary-gear train being connected together for movement, and the third of said gear elements of each of said planetary-gear trains being adaptable for connection to supplementary driving means, whereby two points of power application in addition to said driving shaft are provided, each of said points of power application being effective to vary the angular velocity ratio between said driving and driven shafts, and hydro-mechanical means connected to said driving shaft for applying power to one of said points of power application.

7. In a power transmission, a driving shaft, a driven shaft, gears for interconnecting said driving and driven shafts comprising two planetary-gears trains, each of said gear trains comprising three gear elements, namely, a sun gear, a planetary gear meshing therewith and carried by a support for orbital movement around said sun gear, and a third gear co-axial with its respective sun gear and operatively connected with its respective planetary gear, one of said gear elements of one gear train being connected to said driving shaft, one of said gear elements of the other gear train being connected to said driven shaft, another of said gear elements of each gear train having a common support, and the third of said gear elements of each of said gear trains being adaptable for connection to supplementary driving means, whereby two points of power application in addition to said driving shaft are provided, each of said power application points being effective to vary the angular velocity ratio between said driving and driven shafts and hydromechanical means connected to said driving shaft for applying power to one of said points of power application.

8. In a power transmission, a driving shaft, a driven shaft, gears for interconnecting said driving shaft and said driven shaft comprising two planetary gear trains, each of said gear trains comprising three elements, one of which is displaceable relative to the others, one of said elements of one gear train being connected to said driving shaft, one of said gear elements of the other planetary-gear train being connected to said driven shaft, the displaceable element of each gear train being connected together for movement, and the third of said gear elements of each of said planetary gear trains being adaptable for connection to supplementary driving means, whereby two points of power application, in addition to said driving shaft, are provided, each of said power application points being effective to vary the angular velocity ratio between said driving and driven shafts and hydro-mechanical means connected to said driving shaft for applying power to one of said points of power application.

9. In combination, a driving shaft, a driven shaft, and mechanism responsive to varying speeds of said driving shaft for rotating said driven shaft at a substantially constant speed including a planetary gear train having an input sun gear driven by said driving shaft, an output sun gear for driving said driven shaft, a group of planetary gears connected to said input sun gear, a second group of planetary gears connected to said output sun gear, a rotary cage supporting both groups of planetary gears, separate ring gears connected to said separate groups of planetary gears, a hydraulic transmission including separate pump and motor units, one of said units having a variable stroke, means connecting one of said units to said drive shaft, means connecting the other of said units to one of said ring gears, and means responsive to the speed of rotation of said cage for varying the stroke of said unit.

10. In combination, a driving shaft, a driven shaft, and mechanism responsive to varying speeds of said driving shaft for rotating said driven shaft at a substantially constant speed, including a planetary gear train having an input sun gear driven by said driving shaft, an output sun gear for driving said driven shaft, a group of planetary gears connected to said input sun gear, a second group of planetary gears connected to said output sun gear, a rotary cage supporting both groups of planetary gears, an input ring gear connected to said first group of planetary gears, an output ring gear connected to said second group of planetary gears, mechanism actuated by said drive shaft for rotating said input ring gear or for holding said ring gear fixed, and means responsive to the speed of rotation of said cage for controlling said mechanism so as to maintain the speed of rotation of said driven shaft substantially constant.

11. In combination, driving shaft, a driven shaft, and mechanism responsive to varying speeds of said driving shaft for rotating said driven shaft at a substantially constant speed, including a planetary gear train having an input sun gear driven by said driving shaft, an output sun gear for driving said driven shaft, a group of planetary gears connected to said input sun gear, a second group of planetary gears connected to said output sun gear, a rotary cage supporting both groups of planetary gears, an input ring gear connected to said first group of planetary gears, an output ring gear connected to said second group of planetary gears, mechanism actuated by said drive shaft for rotating said input ring gear or for holding said ring gear fixed, means responsive to the speed of rotation of said cage for controlling said mechanism so as to maintain the speed of rotation of said driven shaft substantially constant, and speed responsive mechanism actuated by said output ring gear for regulating the speed of rotation thereof to further control the speed of said driven shaft.

ELIAS ORSHANSKY, Jr.

REFERENCES CITED

The following references are of record in the file of this patent:

UNITED STATES PATENTS

| Number | Name | Date |
|---|---|---|
| 711,663 | Herdman | Oct. 21, 1902 |
| 1,077,454 | Cooke | Nov. 4, 1913 |
| 1,644,614 | Sanderson | Oct. 4, 1927 |
| 1,740,788 | Sheridan | Dec. 24, 1929 |
| 1,800,062 | Fordyce | Apr. 7, 1931 |
| 2,218,405 | Orshansky | Oct. 15, 1940 |
| 2,219,052 | Orshansky | Oct. 22, 1940 |
| 2,219,984 | Fersing | Oct. 29, 1940 |
| 2,370,675 | McCoy | Mar. 6, 1945 |

FOREIGN PATENTS

| Number | Country | Date |
|---|---|---|
| 307,779 | Great Britain | Mar. 13, 1929 |